US008392507B2

(12) United States Patent
Ramos et al.

(10) Patent No.: US 8,392,507 B2
(45) Date of Patent: Mar. 5, 2013

(54) IMAGE VALIDATION SYSTEM FOR REMOTE DISPLAYS

(75) Inventors: Jeremy Ramos, Tampa, FL (US); Scott Stackelhouse, Tigard, OR (US)

(73) Assignee: Honeywell International Inc., Morristown, NJ (US)

( * ) Notice: Subject to any disclaimer, the term of this patent is extended or adjusted under 35 U.S.C. 154(b) by 890 days.

(21) Appl. No.: 12/506,923

(22) Filed: Jul. 21, 2009

(65) Prior Publication Data
US 2011/0019005 A1    Jan. 27, 2011

(51) Int. Cl.
*G06F 13/00*    (2006.01)
(52) U.S. Cl. ............... 709/205; 709/219; 709/224
(58) Field of Classification Search .............. 709/204, 709/205, 217, 219, 223, 224
See application file for complete search history.

(56) References Cited

U.S. PATENT DOCUMENTS

| 4,085,425 | A |   | 4/1978  | Hamill          |         |
|-----------|---|---|---------|-----------------|---------|
| 4,683,467 | A |   | 7/1987  | Macaulay et al. |         |
| 4,684,996 | A |   | 8/1987  | Baumeister      |         |
| 5,091,773 | A |   | 2/1992  | Fouche et al.   |         |
| 5,216,504 | A |   | 6/1993  | Webb et al.     |         |
| 5,936,610 | A | * | 8/1999  | Endo ........... | 345/157 |
| 6,100,926 | A |   | 8/2000  | Kawashima       |         |
| 6,295,083 | B1|   | 9/2001  | Kuhn            |         |
| 6,310,650 | B1|   | 10/2001 | Johnson et al.  |         |
| 6,720,942 | B2|   | 4/2004  | Lee et al.      |         |
| 7,348,999 | B1|   | 3/2008  | Spitz           |         |
| 7,456,908 | B2|   | 11/2008 | Tai et al.      |         |
| 7,663,691 | B2| * | 2/2010  | Ciudad et al. ..| 348/371 |

* cited by examiner

*Primary Examiner* — Viet Vu
(74) *Attorney, Agent, or Firm* — Ingrassia Fisher & Lorenz, P.C.

(57) ABSTRACT

Systems, methods and devices are disclosed that provided for providing remote video feedback. The disclosure herein includes a transmitting computing device that is configured to produce an image frame encoded with metadata and to transmit the encoded image frame over a network to a remote display device. The remote display device includes a viewing screen contained in a chassis with bevel. The viewing screen includes an information validation pixel with the chassis extending over and covering the image validation pixel. The chassis also includes a photo sensor positioned on the under side of the bezel so as to be in operational view of the image validation pixel. The system also includes a sensor electronics module that is configured to detect the metadata when the metadata is displayed by the information content pixel and is received by the photo sensor. The sensor electronics module also generates image frame feedback information based upon the detecting. A remote computing device is included that is configured to receive the encoded image frame from the transmitting computer, render the encoded image frame upon the viewing screen and re-transmit the image frame feedback information to the transmitting computer from the sensor electronics module.

10 Claims, 6 Drawing Sheets

IMAGE VALIDATION SYSTEM FOR REMOTE DISPLAYS

FIELD OF THE INVENTION

The present invention generally relates to methods and systems used to confirm that the proper informational content and the proper visual presentation of that informational content are being displayed on a remote display device.

BACKGROUND OF THE INVENTION

Computerized conferencing over a network is becoming a common place means for disseminating and explaining information. Such network conferencing saves travel time, fuel and therefore is more economical. The market for network conferencing has spread from corporate entities using internal networks to the public commercial realm and is used in services such as the GoToMeeting® network conferencing service.

Unfortunately, network meetings can, at times, suffer from quality assurance deficiencies. It is not uncommon for a meeting presenter to have to interrupt his presentation to confirm that the receiving party is seeing image display that was intended. Conversely, the receiving party may interrupt the presentation to point out that the presentation quality is poor, distorted or that the wrong video frame is being presented. Such situations are at least embarrassing and may result in a misunderstanding. In the art, the sending party has no way of determining that a problem exists on the receiving display device. As such, it is desirable to have a means to automatically and discretely monitor a remote rendering of an image file.

SUMMARY

A system is provided for providing remote video feedback. The system includes a transmitting computing device that is configured to produce an image frame encoded with metadata and to transmit the encoded image frame over a network to a remote display device. The remote display device includes a viewing screen contained in a chassis with bevel. The viewing screen includes an information validation pixel with the chassis extending over and covering the image validation pixel. The chassis also includes a photo sensor positioned on the under side of the bezel so as to be in operational view of the image validation pixel. The system also includes a sensor electronics module that is configured to detect the metadata when the metadata is displayed by the information content pixel and is received by the photo sensor. The sensor electronics module also generates image frame feedback information based upon the detecting. A remote computing device is included that is configured to receive the encoded image frame from the transmitting computer, render the encoded image frame upon the viewing screen and re-transmit the image frame feedback information to the transmitting computer from the sensor electronics module.

A method for creating feedback data is provided. The feed back describes the rendered image of the appended symbology received from a host computing device and displayed on a remote display device containing. The method includes polling a plurality of photo sensors that are arrayed on the under side of a bezel that is configured to cover one or more image validation pixels of the viewing screen of the remote display device when the image containing the appended symbology is rendered on the viewing screen. The method also includes detecting the outputs of the plurality of photo sensors to distinguish information content pixels form image verification pixels based at least in part on the polling. The method then processes the outputs of the information content pixels to electronically perceive the appended symbology; and synthesizes the feedback data from the plurality of photo sensors containing the content of the perceived appended symbology for analysis.

A display device is provided that includes a viewing screen comprising a plurality of pixels in operable communication with a computing device, a bezel attached to a form factor containing the viewing screen and covering at least a portion of the plurality of pixels and a photo sensor positioned on the underside of the bezel and in operable view of the at least a portion of the plurality of pixels. The computing device is operable to render an image including an appended symbol situated within the image such that the appended image appears via the at least a portion of the plurality of pixels and is viewed by the photo sensor.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The subject matter now will be described more fully below with reference to the attached drawings which are illustrative of various embodiments disclosed herein. Like numbers refer to like objects throughout the following disclosure. The attached drawings have been simplified to clarify the understanding of the systems, devices and methods disclosed. The subject matter may be embodied in a variety of forms. The exemplary configurations and descriptions, infra, are provided to more fully convey the subject matter disclosed herein.

Figure 1A:
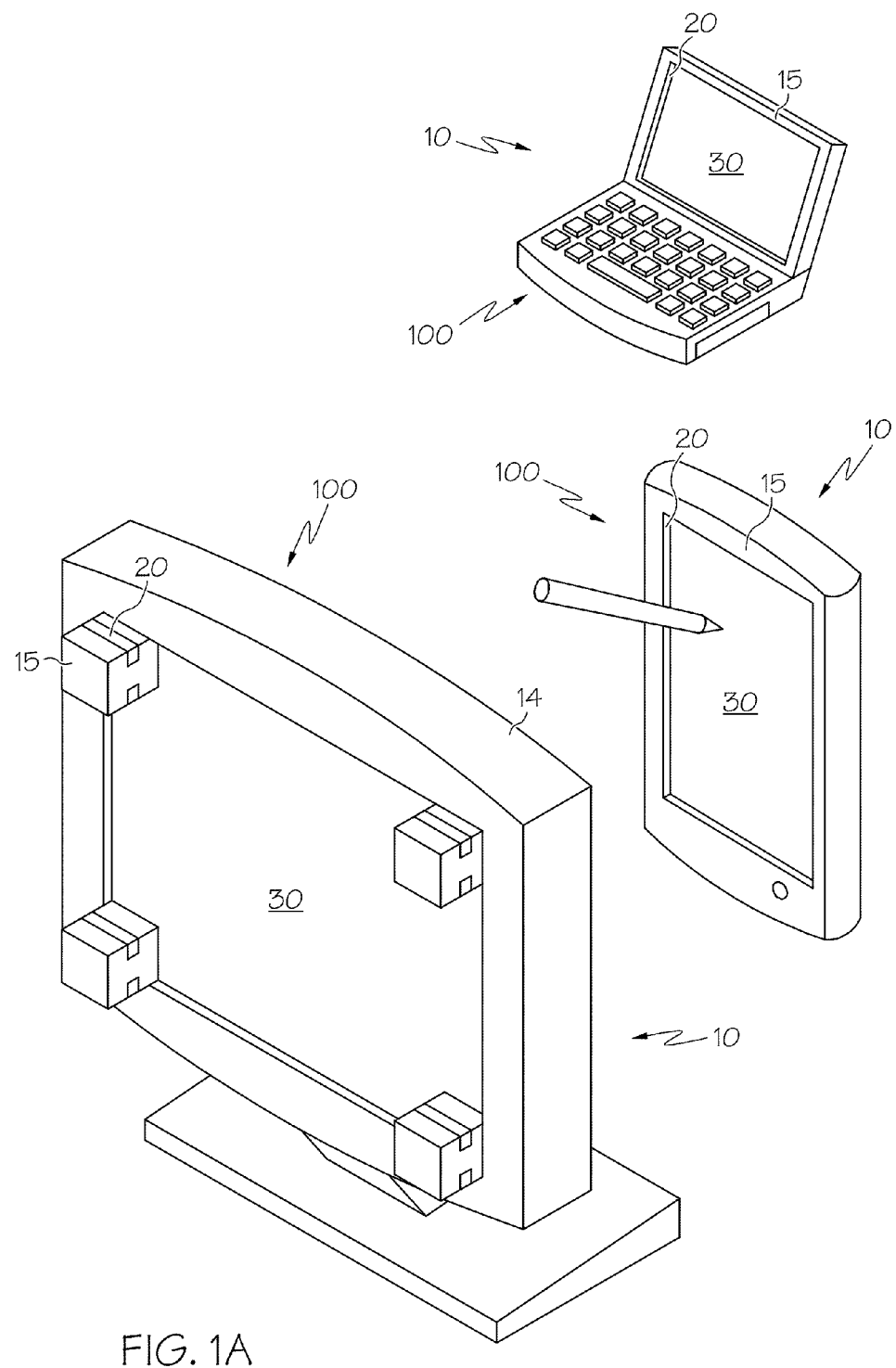
FIG. 1A is a rendition of an exemplary remote display device.
Figure 1B:
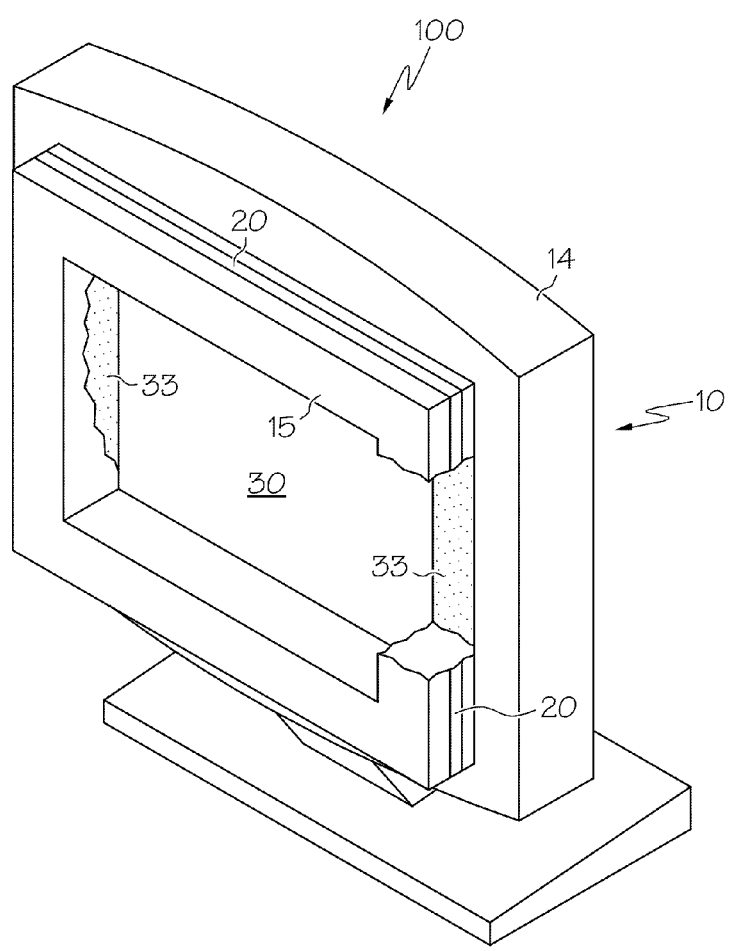
FIG. 1B is a rendition of another exemplary remote display device.

FIGS. 1A and 1B present exemplary depictions of a remote display device 100 configured in accordance with the subject matter disclosed herein. The remote display device 100 may be any suitable display device. Non-limiting, examples of a remote display device 100 may include a desk top computer monitor, a laptop computer, a television, a hand held personal communication device, an aircraft/spacecraft display monitor and the like.

The remote display device 100 comprises a form factor 10, a screen 30, its driving electronics (not shown) and one or more photo sensors 20. The form factor 10 is the chassis that contains and supports the screen 30 and its supporting electronics (not shown). The form factor 10 may resemble an open ended box 14 with a bezel 15 that extends inward from the open edges of the box 14 and protrudes over the face of the screen 30 such that the bezel covers one or more pixels or one or more rows of pixels of the screen 30. In other embodiments, the form factor 10 may include a plurality of bezels 15 (e.g. one at each corner of the screen 30) (See FIG. 1A) or a singe bezel 15 that covers portions of one or more complete sides of the screen 30 (See FIG. 1B). In still further embodiments, the bezel 15 may cover the entire perimeter of the screen 30.

The screen 30 may be any suitable display screen 30. Non-limiting examples of a screen 30 include a cathode ray tube (CRT) monitor, a liquid crystal display (LCD), a plasma screen, a touch screen, a light emitting diode (LED) display or any devices with similar functionality either currently existing or that my be developed in the future.

The screen 30 comprises a plurality of pixels 33 (see FIG. 1C) that cumulatively make up the entire screen area. Pixels may be comprised of independently controlled monochromatic and/or colored sub-pixels. Pixels and sub-pixels of various types that may be used to produce various types of screen 30 are well known in the art. As such, any detailed discussion of the operation of a pixel will be omitted in the interest of brevity and clarity. The use of the term "pixel" herein is intended to refer to current pixel and sub-pixel technology that currently exists and that may be developed in the future.

Although pixels 33 in a display device tend to all operate in the same manner, the pixels 33 may have different functions in various embodiments disclosed herein. There may be pixels 33, image validation pixels 35 and image content pixels 37 (See FIG. 1D).

Image validation pixels 35 are a sub-set of pixels 33 that may be used to display image identification/calibration information because of their proximity to one or more photo sensors 20. Image content pixels 37 are a subset of image validation pixels 35 that actually display image identification/calibration information about an image (e.g. metadata) because the transmitting computer has encoded the image being rendered at the display device 100 to display the identification/calibration information or the metadata at those pixel locations.

The photo sensors 20 may be any suitable photo sensors currently existing or that may exist in the future. Non-limiting examples of a photo-sensor may be a reverse biased LED, a charged-coupled device (CCD), a photo-diode or photo resistors or a combination thereof.

Figure 1C:
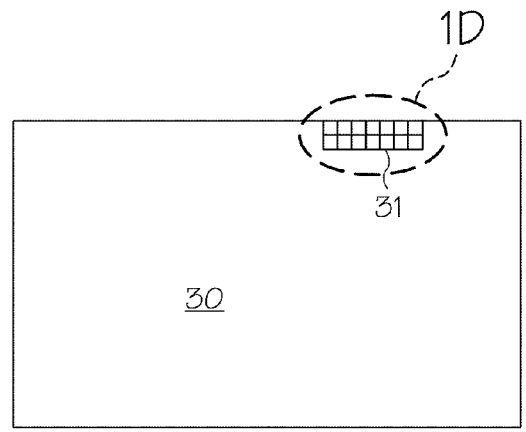
FIG. 1C is a magnified view of some of the pixels making up the screen of an exemplary remote display device screen.
Figure 1D:
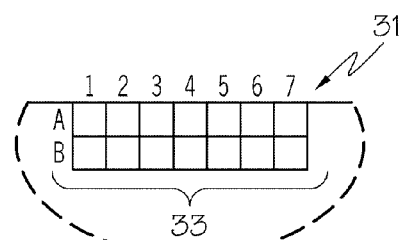
FIG. 1D is a side view of the pixels and the photo sensors in an exemplary remote display device.
Figure 1E:
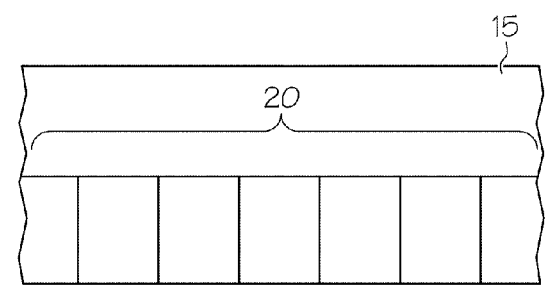
FIG. 1E is an exemplary distribution of image content pixels relative to photo sensors.
Figure 1E:
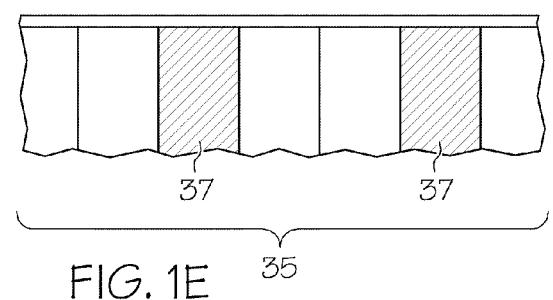

FIG. 1C is a depiction of a screen 30 which may comprise hundreds of rows and hundreds of columns of pixels. The screen 30 may be an off the shelf (OTS) video screen in which case the image validation pixels 35 would displace pixels normally displaying portions of a displayed image. In alternative embodiments, the screen 30 may be a screen configured to include extra rows and/or columns of pixels specifically to be used as image validation pixels 35 so that the pixels 33 normally require for a display image are not infringed. Section 31 is a blown up depiction of a 7×2 area of pixels 33 being representative of the entire screen 30 but may be utilized as image validation pixels 35. or image content pixels 37 (See e.g., FIG. 1E).

Figure 2:
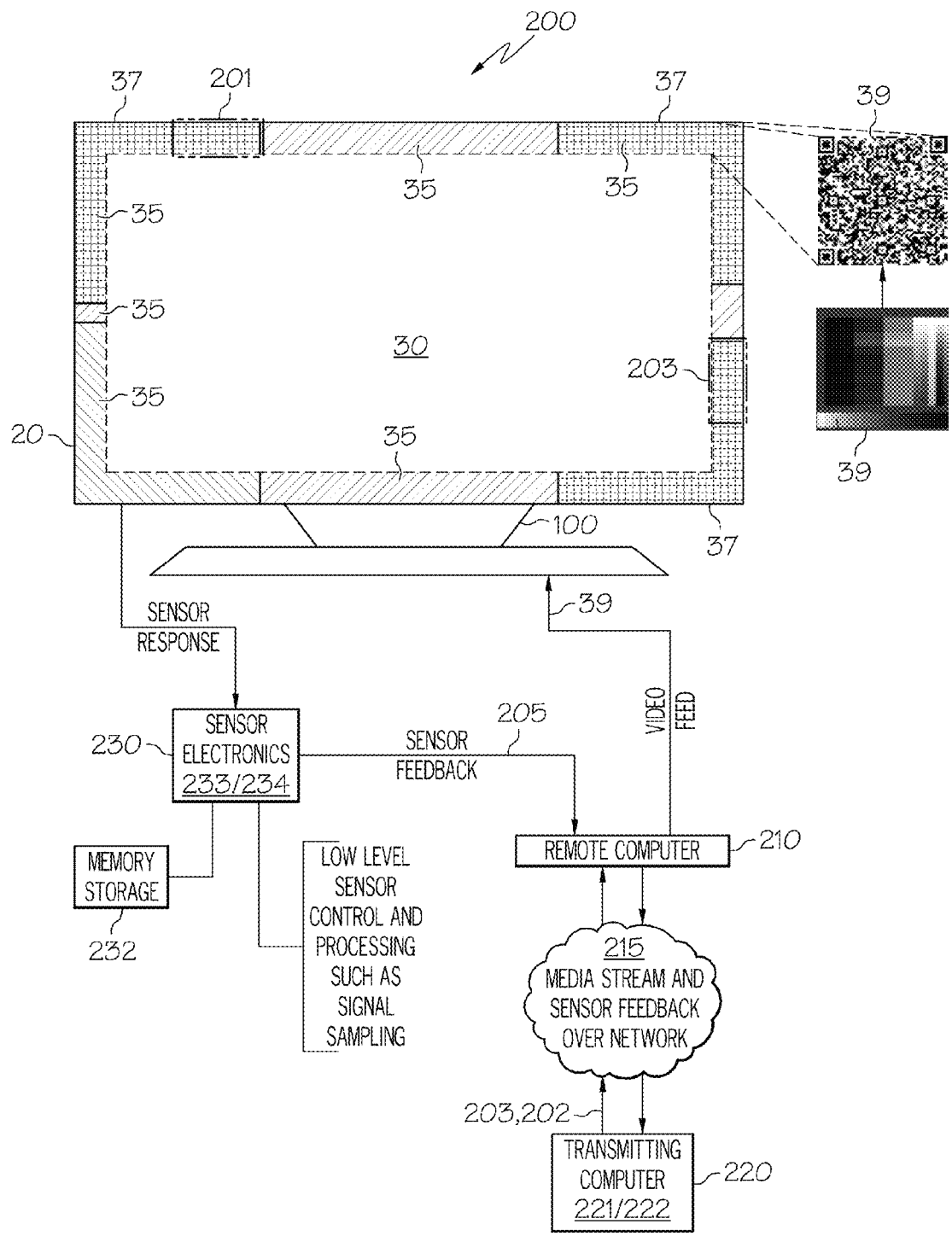
FIG. 2 is a simplified functional block diagram of an exemplary embodiment of the feedback system disclosed herein.

FIG. 2 is a simplified block diagram of an exemplary image feedback system 200, as disclosed herein. The embodiment includes the display device 100, a photo sensor 20, a sensor electronics module 230, a transmitting computing device 220 and an associated remote computing device 210.

FIG. 2 presents an exemplary embodiment wherein there exists a frame, or a complete perimeter, of image validation pixels 35 that may be physically hidden behind the bezel 15 which may have similar dimensions such that a viewer may not see some or all of the image validation pixels. However, one of ordinary skill in the art will recognize that only a small number of image validation pixels 35 may be required to convey desired digital information. As such, in other embodiments the number and location of image validation pixels 35 may be as small a number as one pixel which may be located anywhere behind bezel 15.

At least a subset of the image validation pixels 35 comprises one or more image content pixel(s) 37. At the very least, one image content pixel 37 is included within the plurality of image validation pixels 35 in order to convey image information 39. The image information may be digital or analog. However, for the sake of brevity, only digital image information 39 will be discussed further herein.

The image content pixel 37 is an image validation pixel 35 that actually conveys image information 39 transmitted from a transmitting computer 220 to the remote computer 210. An image content pixel 37 may display encoded image information thereon comprising graphical, textual and color information relevant to an image that is transmitted from the transmitting computer 220 to be displayed on screen 30 by the remote computer 210. Given current pixel technology, one pixel may contain 32 bits of information.

The image content pixel(s) 37 may always be the same image validation pixel(s) 35 or may be others of the image validation pixel(s) 35. Designation as an image content pixel 37 may be communicated by the transmitting computer in a preceding message prior to sending the first image frame. Alternatively, designation as an image content pixel 37 may be communicated by the transmitting computer on and ad hoc basis as the images are being transmitted.

Referring back to FIG. 1C for example. The blow up section 31 illustrates a 2×7 block of image validation pixels 35. In one embodiment, pixel A1 may be the image content pixel 37 at all times. In another embodiment the image content pixel may alternate with other image validation pixel(s) such as B5, A7 or both. In other embodiments there may be multiple simultaneous image content pixels such A7 and B5. In still other embodiments, there may be multiple image validation pixels 35 that become image content pixels 37 in specific patterns, sequences or sequences of specific patterns. One of ordinary skill in the art would appreciate that there are other combinations and permutations for data delivery would be to numerous to discuss fully herein and are curtailed for the sake of brevity.

Further, each image validation pixel 35 may provide the same image information 39 each time that it becomes an image content pixel 37. In other embodiments, the image information 39, or information type, may change from time to time when a particular image validation pixel 35 becomes an image content pixel 37.

The display device 100 also comprises a set of photo sensors 20 that may be configured in an array or may be configured as individual devices. The photo sensors are typically attached to the underside of the bezel 15. FIG. 2 presents an exemplary array of photo sensors 20 that face the screen 30 so that they may detect the data emissions of any image content pixels 37. In the exemplary embodiment of FIG. 2, the photo sensor(s) 20 encompass the entire perimeter of the screen 30 and cover all of the image validation pixels 35 in whatever configuration the image validation pixels 35 may be arranged. Further, the image validation pixels 35 comprise the entire perimeter of the screen 30 where each image validation pixel 35 may be an image content pixel 37.

The exemplary system in FIG. 2 also includes a sensor electronics module photo sensor. The sensor electronics module photo sensor is configured as may be known by those of ordinary skill in the art to receive, decipher, process and integrate the signals being generated by each of the photo sensors 20 when they detect a metadata emission from one or more image content pixels 37. In some embodiments, a specific photo sensor 20 may be registered to a specific corresponding image validation pixel 35. This 1:1 registration may be found useful in embodiments where there may be few image validation pixels 35 or, conversely few photo sensors 20, such that it is specifically known which image validation pixel(s) 35 need to transmit specific information to which specific photo sensor(s) 20.

In other embodiments, the photo sensors 20 may not be registered to a specific image validation pixel but may serve to receive whatever photo emissions that may be detectable. For example, in embodiments where there are relatively large numbers of image content pixels 37 and photo sensor(s) 20 in proximity to each other, multiple adjacent photo sensors may detect a particular image content pixel 37 and, conversely, one photo sensor 20 may detect multiple near by image content pixels 37 (See e.g., FIG. 1E). As such, the sensor electronics module photo sensor may be configured to consolidate redundant information received by adjacent photo sensors 20 and deconflict (i.e. distinguish) different information that may be emitted by adjacent or nearby image content pixels 37.

The use of multiple photo sensors 20 or a photo sensor array may be advantageous in some embodiments. Multiple photo sensors 20 may provide redundancy in case of a sensor failure. For some display devices 100, particularly those of lesser quality, multiple sensors may provide noise reduction by consolidating information from different photo sensors. The use of multiple photo sensors allows detection of screen image resolution anomalies on a broader scale and allows the canvassing of the entire screen 30 for display anomalies.

One of ordinary skill in the art may appreciate that magnifying optics be interposed between the multiple photo sensors 20 and the image content pixels 37 to enhance and sharpen the pixel emissions detected by the photo sensors for further processing. An non-limiting example of magnifying optics may be a right circular cylinder, an elliptic cylinder, a parabolic cylinder, a hyperbolic cylinder or portions thereof such as a half cylinder. In alternative embodiments the interstitial gap between the image validation pixels 35 and the photo sensors 20 may be an air gap or may be filled with a transparent filler to prevent dirt and foreign objects from interfering with the optical data transmission there between.

The processes of deconflicting and consolidation of information content pixel(s) 37 may be accomplished by using signal averaging or other commonly known digital signal processing techniques. As a practical matter, the sensor electronics module photo sensor may comprise hardware, software, firmware or any combination thereof. The sensor electronics module photo sensor may reside in the display device 100, the remote computer 210 or may constitute a standalone device.

The remote computer 210 may be any suitable computing device containing hardware, software or firmware designed to drive the operation of the display device 100 and communicate with a network 215. The remote computer 210 receives video data over the network 215 from a transmitting computer 220. Non-exemplary examples of a remote computer may be a common desktop or laptop computer, an aircraft heads up display (HUD), a multi-function cockpit display unit (MCDU), a radar console, a sonar display console, a command and control console, a personal handheld computing device, a cell phone, and the like.

The network 215 may be any kind of wired or wireless network currently existing or that is developed in the future utilizing any suitable protocol. Non-limiting examples of a network include the internet, an intranet, wide area networks (WAN), local area networks (LAN), wired networks, wireless networks, packet switched telephone networks (PSTN), cellular telephone networks, a CAN bus, a VME bus and a ADFX Ethernet bus, and the like.

The transmitting computer 220 may be any suitably programmed computing device. Non-exemplary examples of a transmitting computer 220 may be a common desktop or laptop computer, an aircraft flight management system (FMS), a personal handheld computing device, a cell phone, a radar system, a sonar system, a combat information system and the like. The transmitting computer 220 is utilized by a transmitting entity to send a visual image to the remote computing device screen 30 such as an HTML web page or a digital data frame. The transmitting entity may be a user or may be another computer that is generating information to a user such an aircraft flight management system (FMS), a combat weapons system, radar system and the like.

Once the image is compiled and stored for transmission in a memory, memory buffer or other storage device 221, a processor 222 controlling the storage device causes the image to be retrieved and processed by an encoding algorithm or a hash algorithm that appends additional identifying and/or calibrating information (a/k/a metadata) to the image information. One of ordinary skill in the art will appreciate that memory, memory buffers, storage devices and processors are all non-limiting, exemplary computer readable media. Such algorithms may include checksums, check digits, fingerprints, randomization functions, electronic watermarks, error correcting codes, steganography, cryptographic hash functions and/or other similar symbology. In creating such symbology, highly contrasting symbols may be used or, alternatively, the symbology may be created by changing the color hue imperceptibly in the appropriate part of the image by changing the least significant digit in the color coding.

In an exemplary embodiment, the additional identifying information may be an image identification number 201 (binary, alphanumeric or otherwise). This identifying information may be inserted anywhere in the data frame where a photo sensor 20 may be expected to be located when rendered on the screen 30 of the remote computer 210. In the embodiment of FIG. 1A, that location may be in view of any of the four corner photo sensors 20. In other embodiments such as the embodiment of FIG. 1B or FIG. 2, that location may be anywhere under the bezel 15 which secures the photo sensors 20 around the perimeter of the screen 30.

Although several of the embodiments disclosed herein configure the display device 100 with the photo sensor(s) 20 that look back at the video display pixels, those of ordinary skill in the art will recognize that the subject matter disclosed herein may either be used in display devices 100 that are front or rear projection display devices. The photo sensor(s) 20 may face the projector such that the identifying and/or calibrating information may be projected on to photo sensor(s).

The image identification number 201 may be the result of any numbering system, sequential or otherwise, such that a particular image being displayed in front of the photo sensor(s) 20 may be uniquely identified by the sensor electronics module photo sensor. The sensor electronics module photo sensor may detect and read the image identification number 201 and feeds back the image identification number to the transmitting computer 220, either directly or in a message format as is known in the art. The transmitting computer 220 may then compare the image identification number 201 received from the sensor electronics module photo sensor to the image identification number 202 that was last transmitted to remote computer 210 by the transmitting computer 220. If there is a match between the received image identification number 201 and the transmitted image identification number 202, then the remote computer 210 and the transmitting computer 220 continue operation as normal.

However, if there is a mismatch between the received image identification number 201 and the last transmitted image identification number 202, or an identifiable image identification number 201 cannot be detected by the sensor electronics module photo sensor, then the transmitting computer 220 is informed that a wrong image, a distorted image, a misaligned image, or no image at all is being displayed on the screen 30 of remote computer 210. One of ordinary skill in the art will appreciate that the determination may be accomplished by comparison, subtraction or by applying any other logical operation or algorithm that may be useful by those skilled in the art to carry out the determination.

In other embodiments, calibrating information 203 (a/k/a, registry marks) may be used to confirm that the last image received and displayed on screen 30 is properly displayed. Calibrating information 203 may be any type of registry mark, symbol, pattern, code, image identification number 201, text or color(s) that may be displayed by a subset of image validation pixels 35.

The transmitted calibrating information 203 is "location specific" as opposed to the image identification number 201 which need not be. The calibrating information 203 may be embedded into an electronic image at the transmitting computer 220 by any of the means disclosed above or they may be embedded is some other manner known in the art. The embedding may be accomplished during the same process as the image identification number 201 or it may be accomplished using a separate and/or different means of embedding.

There may be any number of registry marks making up the calibrating information 203. The number of registry marks used is a design choice that may be guided by the degree of calibration desired and the number of types, makes and models of display devices 100 that are desired to be compatible with the feedback system 200 disclosed herein.

For example, if display device 30 only has a single photo sensor 20, a single registry mark embedded in the image being transmitted may be sufficient. However, that single registry mark will have to be placed at a location in the image that corresponds to the location of the single photo sensor 20 on display device 100. In other words, if the particular make and model of the display device 100 only has a single photo sensor, then that the location is where the registry mark needs to appear in the image when rendered.

In embodiments addressing display devices 100 with multiple photo sensors 20 located variously around the perimeter of the remote screen 30, embedding multiple registry marks may be found to be advantageous. Each registry mark may be associated with a particular photo sensor 20 or a group of photo sensors of the display device 100. As such, in a properly aligned image presentation, each registry mark would appear within view of (i.e. registered with) its intended photo sensor 20. One of ordinary skill in the art will appreciate that a multi-photo sensor embodiment may provide superior calibration capability because each of a plurality of registry marks embedded within the image would be registered with a corresponding photo sensor 20 or group of photo sensors in a properly presented image. In such an arrangement, the transmitting computer 220 is able to determine from the feedback from the sensor electronics photo sensor whether or not the transmitted image is being properly aligned within the screen 30. If every registry mark is detected as expected, the image frame is properly aligned on the screen 30 of the display device 100. If one or more of the plurality of the registry marks is not detected by the sensor electronic photo sensor, then the transmitting computer 220 would be able to determine from the information feedback 205 which registry mark(s) were not detected and which portion of the image frame may be poorly aligned (i.e. the left side). Corrective action may then be taken such as resending the image, recalibrating the image transmission or taking other corrective and/or notification action.

In still further embodiments, an image identification number 201 may concurrently be calibrating information 203. As such, the image identification number may then also be location dependent in its role as being calibrating information 203. However, one of ordinary skill in the art would appreciate that that the image identification number 201, if detected anywhere in the transmitted image frame by the sensor electronic photo sensor, would positively identify the specific image frame being rendered by the display device 100.

Figure 3:
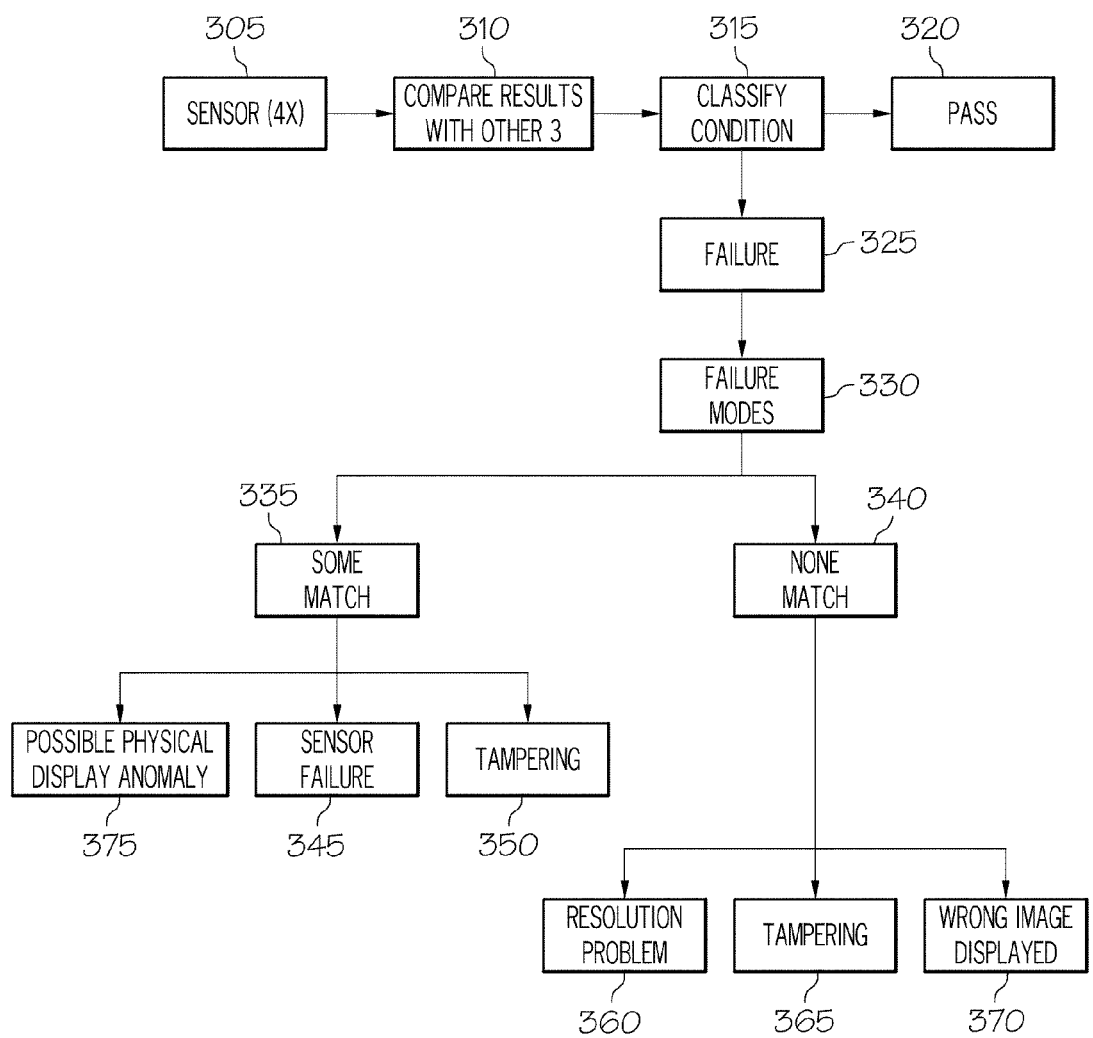
FIG. 3 is an exemplary logic diagram of the sensor electronics module.

FIG. 3 is a simplified exemplary logic flow diagram for the operation of the sensor electronic module photo sensor monitoring four (4) photo sensors. Those of ordinary skill in the art will appreciated that steps may be combined, split out, added and replaced with process of similar operability without deviating from the scope of this disclosure.

At process 305, outputs of the photo sensors 20 are received by the sensor electronic module photo sensor. At process 310, the four sensors are compared together to determine if there is a failure. If the four outputs match the transmitted information (202,203) at process 315 then the image being rendered on the screen 30 is the correct image and the image passes at process 320. The four outputs may be considered to be "as expected" if the proper image indentifying information 201 is detected and all calibrating information 203 is also detected by their respective and associated photo sensors. However, if all or some of the image identifying information or image calibrating information is not properly detected then a failure has occurred at process 325.

At process 330, the sensor electronic package photo sensor polls the photo sensors 20 to determine if some of the photo sensor outputs match the transmitted image identifying/image calibrating data. If some of the photo sensor outputs match at process 335 then a physical display anomaly message may be sent to the transmitting computing device 220 at process 375, a Sensor Failure message at process 345 and a possible tampering message set at process 350.

However, if none of the photo sensor outputs match at process 340, the transmitted image identifying/image calibrating data then an Image Resolution Error message may be sent at process 360, a possible tampering message sent at process 365 or a Wrong Image Displayed message sent at process 370. One of ordinary skill in the art will appreciate that the simplified exemplary embodiment of FIG. 3 is limited for simplicity and brevity. However, after reading the disclosure herein, a plethora of sensor combinations and status messages may suggest themselves without deviating from the scope of the disclosure herein.

Figure 4:
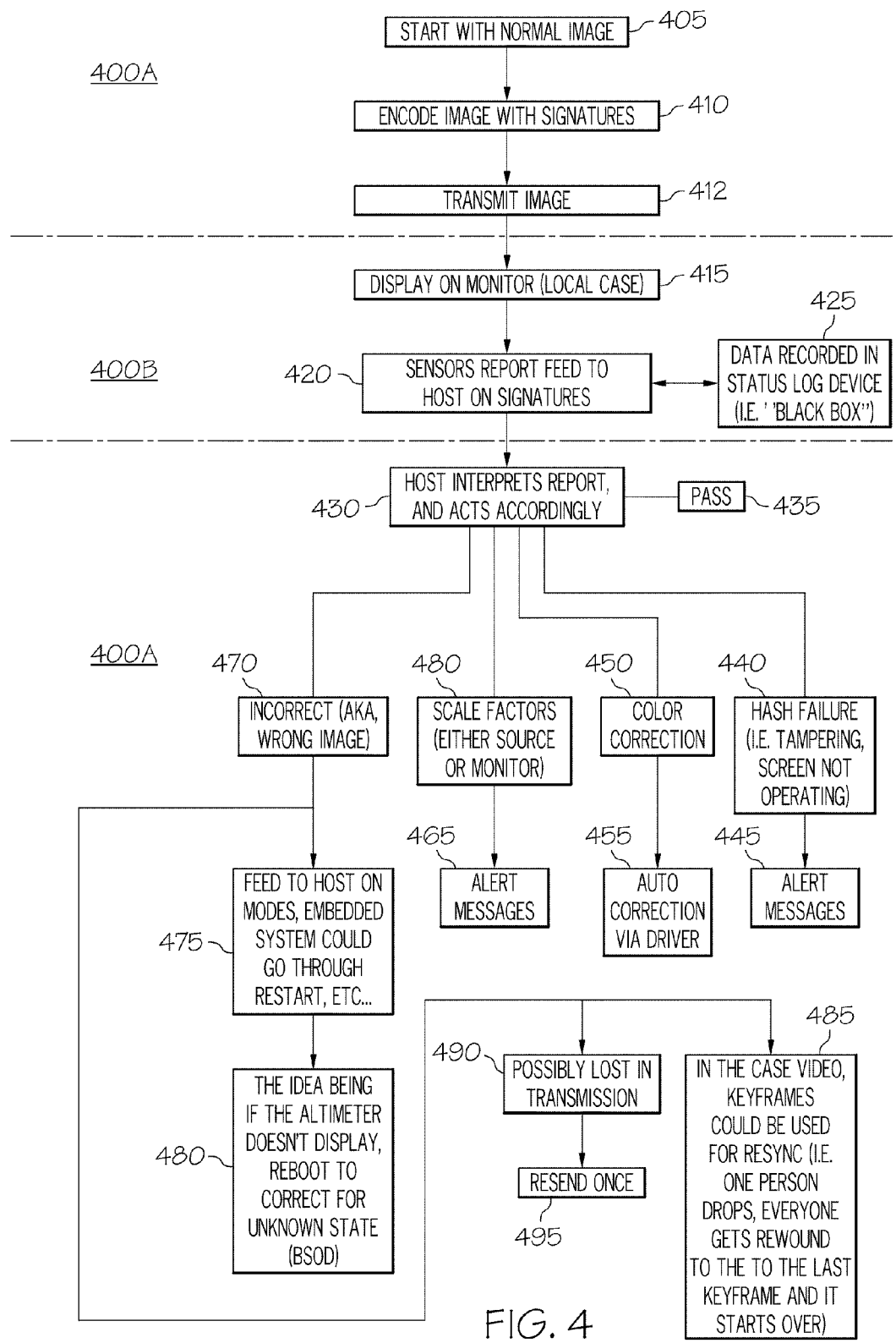
FIG. 4 is a simplified logic flow chart of an embodiment of the feedback system disclosed herein.

FIG. 4 is a simplified flow diagram that depicts the process performed by the feedback system 200. Sections 400A include processes performed by the host or transmitting computing device 220. Section 400B includes processes performed by the remote computer 210.

At process 405, an image file or frame is created by a computer application. The image file may be created in any suitable format. Non-limiting examples include image and text files such as .doc, jpg, .vsd, .bmt, .pdf, HTML, and the like.

At process 410, the image file is encoded with identification and/or calibrating information using a watermarking, hash or other type of algorithm as may be known in the art. It is preferable that the identification or calibrating information is located at the periphery of the image such that the identification and/or calibrating information is displayed by predetermined image validation pixels 35 hidden from view under the bezel 15 of the display device 100.

At process 412, the encoded image is transmitted to the remote display device 100 by via the network 215 by the transmitting computer 220. In embodiments where the transmitting computer and the remote computer are integrated parts of a self contained system (e.g. an avionics or flight control system), the transmitting computer 220 may be the aircraft FMS and the remote computer 210 may be a processor controlling the HUD with an Aviation Full-Duplex Ethernet (AFDX) bus being the network 215.

At process 415 the remote computer 210 receives the image and displays the image file on the display screen 30, wherein the identifying information and/or the calibrating information is displayed by one or more image content pixels 37. Once displayed, the sensor electronics photo sensor may poll each of the photo sensors 20 at process 420 to determine which photo sensors 20 are detecting image content pixels 37 and what data are being displayed by those image content pixels 37. The polled identifying and/or calibrating data may be transmitted to the transmitting computer 220 and/or to memory storage device 232.

At process 425, the data retrieved from the photo sensor(s) 20 may be stored automatically to a memory storage device 232 as a status log for future trouble shooting and analysis. The memory storage device may be a flight data recorder (i.e. a "black box) such that the images displayed on a particular cockpit display device and their viewing quality may be recreated.

At process 430, the identifying and/or calibrating data is received at the transmitting computer to close the feed back loop, where the identifying and/or calibrating data is further analyzed, interpreted and classified. If the calibrating and/or identifying information returned to the transmitting computer 220 matches the registry marks and serial number encoded on the image sent by the transmitting computer 220, then it is determined that the image sent to the remote computing device was rendered properly on its screen 30 and is classified as such.

Depending on the complexity of the sensor electronics, properly rendered calibrating and/or identifying information may comprise a matching list of identifying and/or calibrating information. In other words, the information embedded in the image matches what the sensor electronics photo sensor detected in the image when rendered. In more sophisticated embodiments, properly rendered calibrating and/or identifying information may comprise a specific pixel location for each piece of calibrating and/or identifying information where the information was actually rendered.

If none of the calibrating and/or identifying information returned to the transmitting computer 220 matches the registry marks and serial number encoded on the image, there is an indication of a system failure. For example, there may have been a resolution failure where none of the registry marks were in a position to be detected by their respective photo sensors 20. This result may be interpreted as the wrong image was displayed. For example, image 234 was transmitted but image 233 was actually rendered on the screen 30. This result may also indicate tampering with the image, a resolution problem or a failure of the encoding process.

At process 440, if it is determined that there was an encoding failure, tampering, or screen 30 is not operating, for example, alert messages may be sent at process 445. If it was determined that the wrong image or no image was being rendered at process 470, that may indicate that the image was lost in transmission at process 490, the correction for which would be a resending of the proper image at process 495. Alternative responses may include rebooting the remote computer 210 at process 475. Further responses may include a "Do Not Trust" message being sent to the remote computer 210 or, if there are multiple adjacent (physically or adjacent), shifting the image to another display device 100.

In the case of the image being rendered is a video clip at process 485, key frames may have been pre-identified throughout the video clip. If the calibrating and/or identifying data fails to match, the video clip could be resynchronized to the last key frame and the video clip restarts from there.

In the situation where some of the identifying and/or calibrating information matches the transmitted information 202, 204 being fed back, that may indicate that the scaling factors at either the transmitting computer 220 or the remote computer 210 are incorrect, in which case alert messages may be sent or automatic position correction may be initiated. Automated display video positioning and scaling is known in the art. An exemplary, non-limiting means may be found in the co-owned, co-pending application Ser. No. 11/282,983, filed on Nov. 18, 2005 and is herein incorporated by reference in its entirety.

At process 450, it may be determined that the color of the image is incorrect. Such a problem may be auto corrected by adjusting a video driver at the remote computer 210. Further, those of ordinary skill in the art, after reading the disclosure herein will appreciate that there are other failure modes, indictors or failure modes and corrective actions for those failure modes in addition to those exemplary failure modes disclosed herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A system for providing remote video feed back, comprising:
   a transmit computing device, the transmit computing device configured to produce an image frame, encode the image frame with metadata and transmit the encoded image frame over a network;
   a remote display device comprising a viewing screen contained in a chassis, the viewing screen including an information validation pixel and the chassis including an attached bezel extending over and covering the image validation pixel;

a photo sensor positioned so as to be in operational view of the image validation pixel;

a sensor electronics module configured to detect the metadata when the metadata is displayed by the information content pixel and is received by the photo sensor and to generate image frame feedback information based upon the detecting; and a remote computing device configured to receive the encoded image frame from the transmit computing device, render the encoded image frame upon the viewing screen and re-transmit the image frame feedback information to the transmit computing device.

2. The system of claim 1 wherein, the metadata comprises a serial number uniquely identifying the image frame.

3. The system of claim 1 wherein, the metadata comprises a registry mark indicating the proper orientation and positioning on the viewing screen relative to the photo sensor.

4. The system of claim 2 wherein, the metadata comprises a registry mark indicating the proper orientation and positioning on the viewing screen relative to the photo sensor.

5. The system of claim 2 wherein the serial number is a hash.

6. The system of claim 2, wherein the transmitting computing device is programmed to resend the image frame when the feedback information fails to contain the serial number of the encoded image frame transmitted.

7. The system of claim 1, wherein the remote computing device renders the metadata on the viewing screen by changing the image verification pixel to an image content pixel by causing the metadata to be displayed by the image validation pixel.

8. The system of claim 1, wherein the remote display device comprises one photo sensor for each image verification pixel in a one-to-one registration.

9. The system of claim 1, wherein the remote display device comprises one photo sensor to monitor a plurality of image verification pixels.

10. The system of claim 1, wherein the remote display device comprises a plurality of photo sensors to monitor one image verification pixel.

\* \* \* \* \*